Patented Aug. 18, 1953

2,649,481

UNITED STATES PATENT OFFICE 2,649,481

RECOVERY OF DIALKYL AMIDES FROM POLYACRYLONITRILE SPINNING BATHS

John R. Caldwell, Kingsport, Tenn., assignor to Eastman Kodak Company, Rochester, N. Y., a corporation of New Jersey No Drawing. Application May 12, 1951, Serial No. 226,101

4 Claims. (Cl. 260—561)

The invention relates to the recovery of dialkyl amides from aqueous spinning baths. In the wet spinning of polyacrylonitrile fibers, it is common practice to use lower dialkyl amides of lower fatty acids, such as dimethyl formamide, diethyl formamide, dimethyl acetamide and diethyl acetamide, as solvents for the polyacrylonitrile. The dialkyl amide solution of the polyacrylonitrile is extruded into an aqueous spinning bath, where the polyacrylonitrile is precipitated from solution in the form of filaments, and the dialkyl amide dissolves in the water.

It is desirable to recover the dialkyl amide from the aqueous spinning bath. However, in addition to the dialkyl amide, the spinning bath contains small amounts of low molecular weight polyacrylonitrile, and catalyst salts, emulsifiers, polymerization regulators, etc., used in preparing the polyacrylonitrile. If an attempt is made to recover the dialkyl amide by distilling off the water, these impurities concentrate in the still pot and coat the walls. Moreover, they catalyze decomposition of the dialkyl amides. During the final stages of distillation the impurities become highly concentrated, and frequently cause a serious reduction in the yield of recovered dialkyl amide. Furthermore, the dialkyl amide recovered by distilling off the water must be purified by distillation.

I have discovered that the lower dialkyl amides of the lower fatty acids can be successfully and economically recovered from aqueous spinning baths used in polyacrylonitrile spinning, by extracting with a saturated aliphatic alcohol having four to five carbon atoms, and distilling off the alcohol. The impurities are not dissolved by the alcohol. Up to 50 per cent, preferably 20 to 40 per cent, of a supplementary solvent may be mixed with the alcohol. This is particularly advantageous in the case of butyl alcohol, which is appreciably soluble in water. If, for instance, a mixture of 60 parts butyl alcohol and 40 parts toluene is employed, the mixed solvent is a good extractant for the dialkyl amides, and the solubility of the butyl alcohol in water is greatly reduced. This results in a decrease in the loss of butyl alcohol during the extraction process. Moreover, in many cases, the supplementary solvent forms a low-boiling azeotrope with water, and hence greatly facilitates the removal of water from the alcoholic solution of extracted dialkyl amide.

The supplementary solvents which may be employed in conjunction with the alcohols are the following:

a. Aromatic hydrocarbons having from 6 to 8 carbon atoms, such as benzene, toluene, xylene, and ethyl benzene.

b. Aliphatic esters containing from 4 to 6 carbon atoms, such as ethyl acetate, isopropyl acetate, butyl acetate, methyl butyrate, butyl formate, and isobutyl acetate.

c. Aliphatic ethers containing from 6 to 8 carbon atoms, such as di-isopropyl ether, di-isobutyl ether, methyl-amyl ether, and ethyl-butyl ether.

d. Saturated aliphatic ketones containing from 4 to 7 carbon atoms, such as methyl-ethyl ketone, methyl-isobutyl ketone, diethyl ketone, and ethyl-isobutyl ketone.

These solvents have boiling points between 65° C. and 150° C.

Examples of mixed solvents which are useful in carrying out my invention are as follows:

60–80% n-butyl alcohol+40–20% toluene
60–80% n-butyl alcohol+40–20% isobutyl acetate
60–80% isobutyl alcohol+40–20% isobutyl acetate
60–80% isobutyl alcohol+40–20% toluene
70–80% mixed amyl alcohols+30–20% toluene
70–80% mixed amyl alcohols+30–20% xylene
70–80% mixed amyl alcohols+30–20% butyl acetate
60–80% sec.-butyl alcohol+40–20% isobutyl acetate
60–80% isobutyl alcohol+40–20% isopropyl ether
60–80% isobutyl alcohol+40–20% isobutyl ether Amyl alcohol or a mixture of primary and secondary amyl alcohols is of particular value for use in the invention. A mixture of amyl alcohols sold under the trade name of "Pentasol" can be used to advantage. This mixture consists primarily of 1-pentanol, 3-methyl-1-butanol, and 2-methyl-1-butanol, together with secondary isomers. This mixture boils in the range of 112–140° C., and has good solvent power for dialkyl amides. Furthermore, the amyl alcohol mixture forms an azeotrope with water, boiling at 91–95° C. and containing approximately 35% water. The amyl alcohol mixture can be employed by itself or in combination with a supplementary solvent.

The partition ratios of several dialkyl amides between water and alcoholic extracting agents are shown in the table below. These values were determined by using 30 cc. water, 30 cc. extractant, and 3.0 g. dialkyl amide, at 25–30° C.

*Partition ratios*

| Amide | Solvent | Percent Amide in— | |
|---|---|---|---|
| | | Water | Alcohol |
| Dimethyl formamide | Mixed amyl alcohols (Pentasol) | 77 | 23 |
| Dimethyl acetamide | Mixed amyl alcohols | 73 | 27 |
| Do | n-Butyl alcohol | 58 | 42 |
| Do | 67 Butyl alcohol+33 toluene | 63 | 37 |
| Diethyl acetamide | Mixed amyl alcohol | 25 | 75 |
| Diethyl formamide | Mixed amyl alcohols | 33 | 67 |

It will be noted that in most cases, more than 50% of the amide remains in the water when the aqueous solution is extracted with an equal volume of solvent. Hence it might be thought that extraction with my alcoholic solvents would not be practical. However, the process can be made continuous, the alcoholic solvent being recovered by distillation and returned to the extraction process. Furthermore, although it may not be economical to recover all of the dialkyl amide by this method, a considerable proportion of it can be efficiently extracted in this way.

For example, a solution of polyacrylonitrile in a dialkyl amide is extruded into a spinning bath which originally consists of water. As the spinning process goes on, the concentration of dialkyl amide in the spinning bath builds up, and may be allowed to reach 25–30%. The wet yarn is carried to counter-current wash rolls. The dialkyl amide content of the wash water gradually becomes higher as the wash water is fed from roll to roll toward the spinning bath, until it finally contains 25 to 30% dialkyl amide. At a point in the wash system where the concentration of dialkyl amide is 10 to 20%, part of the wash water is diverted to the solvent extraction system, where about one-half the amide is extracted. The water containing 5 to 10% amide is then returned to the wash system. At some stage in the process, it is necessary to make a complete separation of water from the amide and send the water to waste, but the amide recovered at this point usually represents less than one-third of the total recovered amide.

In the extraction system itself, any of the usual methods for liquid extraction can be employed. For example, the alcohol extractant can be pumped into the bottom of a column containing the aqueous amide solution and allowed to rise in the form of small droplets. The alcoholic solution of amide is then removed at the top of the column and distilled to separate the amide from the solvent. Extraction can be carried out at temperatures of from 0° C. to 100° C. Distillation can be carried out continuously during the extraction process and in this way the alcohol can be continuously recycled through the extraction chamber. In most cases, the alcoholic solution of amide contains some water. This comes off during the first part of the distillation as an azeotrope with the alcohol or supplementary solvent. The alcohol is then removed by fractional distillation to leave a residue of pure amide. Distillation can be carried out at atmospheric or reduced pressure.

In most cases, it is more economical to distill butyl or amyl alcohol from the amide than it would be to distill water from the amide, even if the aqueous solution contained no impurities. For example, to recover 10 g. of amide from 10% aqueous solution by distilling off the water, it is necessary to heat 90 g. of water from, e. g., 20° C. to 100° C. and then vaporize the water. The amount of heat required for this process is calculated as follows:

Specific heat of water _____ 1.0
Heat of vaporization of water _____ 540 at 100° C.
Temperature rise _____ 80° C.

90×80×1.0= 7,200 cal. to heat the water
90×540=  48,500 cal. to vaporize the water Total ___ 55,700 cal.

On the other hand, according to the partition ratios given above, from a 10% aqueous solution of dimethylacetamide, 90 cc. of n-butyl alcohol will remove 4.2 g. of amide from 90 cc. of water in a single extraction. Therefore, to remove 10 g. of the amide from 10% aqueous solution would require 10/4.2×90=214 cc. or 173 g. of n-butyl alcohol.

Specific heat of n-butyl alcohol _____ 0.6
Heat of vaporization of n-butyl alcohol ____ 141 at 117° C.
Temperature rise _____ 97° C.

173×0.6×97=10,068 cal. to heat the alcohol
173×141=   24,393 cal. to vaporize the alcohol Total ____ 34,461

Here the saving in heat amounts to over 21,000 cal. per 10 g. of amide recovered. Moreover, after the alcohol has been removed, the residual amide is usually pure enough to use without distilling, whereas, when the aqueous spinning bath or wash water is distilled, the amide recovered must always be purified by distillation.

By way of illustrating the manner in which my invention may be carried out, I give the following examples:

*Example 1.*—A solution of polyacrylonitrile in dimethyl acetamide is extruded through a multihole spinneret into a precipitating bath consisting of 20% dimethyl acetamide and 80% water. The wet filaments are carried from the bath to counter-current wash rolls where they are progressively washed with dimethyl acetamide solutions of diminishing concentration, and finally with water. At a point in the wash system where the concentration of dimethyl acetamide is 14–16%, a portion of the wash liquid is removed for partial recovery of the acetamide. At this point, the aqueous solution also contains appreciable amounts of sodium sulfate, sodium sulfite, sodium lauryl sulfate, and phosphoric acid which were introduced during the preparation of the polymer and spinning solution. Low molecular weight polymer is also present.

The aqueous solution, containing 14–16% dimethyl acetamide and the impurities listed above, is placed in a column 6 inches in diameter and 12 feet high. A mixture of 70 parts sec-butyl alcohol and 30 parts benzene is pumped in at the bottom through a dispersion plate at the rate of 0.5 gallon per minute. The extraction is continued until the concentration of dimethyl acetamide is reduced to 5–6%. The solution is then returned to the counter-current wash system. The alcoholic layer is removed at the top of the column and placed in a distillation vessel. An azeotropic mixture of benzene and water is first distilled off, followed by the sec-butyl alcohol. The residual dimethyl acetamide is sufficiently pure to use as a solvent for the preparation of spinning solutions. Analysis shows that it contains no low molecular weight polymer and less than 0.1% inorganic salts.

*Example 2.*—A solution of polyacrylonitrile in dimethyl formamide is spun into an aqueous bath consisting of 25% dimethyl formamide and 75% water. The filaments are washed on counter-current rolls as described in Example 1. At a point where the concentration of dimethyl formamide is 16–18%, a portion of the wash liquid is removed for partial extraction of dimethyl formamide. The solution also contains appreciable amounts of dissolved salts and low molecular weight polymer. The aqueous solution of dimethyl formamide is placed in a column as described in Example 1. A mixture of amyl alcohols (trade-name Pentasol) is used as the extracting agent. Extraction is continued until the concentration of dimethyl formamide is reduced to 3–5%. The aqueous solution is then returned to the yarn washing system. The amyl alcohol layer is distilled at atmospheric pressure. The residual dimethyl formamide is pure enough for use without distillation. Analysis shows that it contains less than 0.2% inorganic salts and no low molecular weight polymers.

*Example 3.*—A mixture of 80 parts isobutyl alcohol and 20 parts isobutyl ether is used as the extracting agent in the process of Example 1.

*Example 4.*—The spinning is carried out as in Example 1. At a point in the wash system where the concentration of dimethyl acetamide is 15–20%, a portion of the wash liquid, containing the impurities mentioned in Example 1, is removed for partial recovery of the dimethyl acetamide. The aqueous solution is placed in a column 3 inches in diameter and 15 feet high. A mixture of 65 parts n-butyl alcohol and 35 parts toluene is pumped into the bottom of the column through a dispersion plate at the rate of 0.3 gal./min. The alcoholic layer is removed from the top of the column and fed into a continuous still which separates the water as an azeotrope with toluene, then strips the toluene and butyl alcohol from the amide, which is removed at the bottom of the still. The extraction is continued until the concentration of dimethylacetamide in the aqueous solution is reduced to 4–6%.

*Example 5.*—Mixed amyl alcohols (trade-name Pentasol) are used as the extractant in the process of Example 4. The water is removed from the alcohol-dimethyl acetamide solution by distilling as an azeotrope boiling at 91–95° C. The amyl alcohols are then removed from the dimethyl acetamide by distillation.

*Example 6.*—A solution of polyacrylonitrile in diethyl formamide is extruded through a multihole spinneret into a precipitating bath consisting of 30% diethyl formamide and 70% water. The wet filaments are carried from the bath to countercurrent wash rolls where they are progressively washed with diethyl formamide solutions of diminishing concentration, and finally with water. At a point in the wash system where the concentration of the diethyl formamide is 20–25%, a portion of the wash liquid is removed for partial recovery of the diethyl formamide. It is placed in a column 2 inches in diameter and 12 feet high. A mixture of 60 parts n-butyl alcohol and 40 parts isobutyl acetate is pumped into the bottom of the column at 0.2 gal./min. and the column is maintained at 50–55° C. The alcoholic solution of diethyl formamide is removed at the top of the column and passed into a continuous still. A small amount of water is fractionated off as a two-layer azeotrope. The n-butyl alcohol and isobutyl acetate are removed from the amide by distillation at atmospheric pressure. Pure diethyl formamide is collected at the bottom of the still. The organic layer from the water azeotrope is combined with the n-butyl alcohol-isobutyl acetate fraction and recycled through the extraction column. The extraction is continued until the concentration of diethyl formamide in the aqueous solution is reduced to 4–6%.

In the appended claims, I use the term "spinning bath" to include both the aqueous liquid into which the polyacrylonitrile solution is spun, and the aqueous liquid in the wash system.

What I claim as my invention and desire to be secured by Letters Patent of the United States is:

1. A process of recovering a lower dialkyl amide of a lower fatty acid from an aqueous spinning bath into which a solution of polyacrylonitrile in the dialkyl amide has been spun, which comprises extracting the dialkyl amide with an aliphatic monohydric alcohol selected from the group consisting of the butyl alcohols and the amyl alcohols, and distilling off the alcohol.

2. A process of recovering a lower dialkyl amide of a lower fatty acid from an aqueous spinning bath into which a solution of polyacrylonitrile in the dialkyl amide has been spun, which comprises extracting the dialkyl amide with a solvent comprising at least 50% of an aliphatic monohydric alcohol selected from the group consisting of the butyl alcohols and the amyl alcohols, the balance of the solvent being a compound having a boiling point between 65° C. and 150° C., selected from the group consisting of aromatic hydrocarbons containing from 6 to 8 carbon atoms, aliphatic esters containing from 4 to 6 carbon atoms, aliphatic ethers containing from 6 to 8 carbon atoms, and saturated aliphatic ketones containing from 4 to 7 carbon atoms, and distilling off the solvent.

3. A continuous process of recovering a lower dialkyl amide of a lower fatty acid from an aqueous spinning bath into which a solution of polyacrylonitrile in the dialkyl amide has been spun, which comprises diverting a portion of the spinning bath to an extraction system, extracting a portion of the dialkyl amide with an aliphatic monohydric alcohol selected from the group consisting of the butyl alcohols and the amyl alcohols, distilling off the alcohol from the alcoholic layer to recover dialkyl amide, returning the alcohol to the recovery system, and returning the aqueous layer to the spinning bath.

4. A continuous process of recovering a lower dialkyl amide of a lower fatty acid from an aqueous spinning bath into which a solution of polyacrylonitrile in the dialkyl amide has been spun, which comprises diverting a portion of the spinning bath to an extraction system, extracting a portion of the dialkyl amide with a solvent comprising at least 50% of an aliphatic monohydric alcohol selected from the group consisting of the butyl alcohols and the amyl alcohols, the balance of the solvent being a compound having a boiling point between 65° C. and 150° C., selected from the group consisting of aromatic hydrocarbons containing from 6 to 8 carbon atoms, aliphatic esters containing from 4 to 6 carbon atoms, aliphatic ethers containing from 6 to 8 carbon atoms, and saturated aliphatic ketones containing from 4 to 7 carbon atoms, distilling off the solvent from the organic solvent layer to recover dialkyl amide, returning the solvent to the recovery system, and returning the aqueous layer to the spinning bath.

JOHN R. CALDWELL.

References Cited in the file of this patent

UNITED STATES PATENTS

| Number | Name | Date |
|---|---|---|
| 2,404,716 | Hansley | July 23, 1946 |
| 2,404,723 | Merner | July 23, 1946 |
| 2,404,724 | Houtz | July 23, 1946 |
| 2,404,725 | Rogers | July 23, 1946 |
| 2,502,030 | Scheiderbauer | Mar. 28, 1950 |
| 2,529,449 | Ham | Nov. 7, 1950 |